(12) United States Patent
Peterson et al.

(10) Patent No.: US 11,347,619 B2
(45) Date of Patent: May 31, 2022

(54) LOG RECORD ANALYSIS BASED ON LOG RECORD TEMPLATES

(71) Applicant: Red Hat, Inc., Raleigh, NC (US)

(72) Inventors: Michel Peterson, Raanana (IL); Michael Kolesnik, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 16/529,134

(22) Filed: Aug. 1, 2019

(65) Prior Publication Data

US 2021/0034497 A1  Feb. 4, 2021

(51) Int. Cl.
| | |
|---|---|
| *G06F 11/00* | (2006.01) |
| *G06F 11/34* | (2006.01) |
| *G06F 11/30* | (2006.01) |
| *G06F 11/32* | (2006.01) |

(52) U.S. Cl.
CPC ...... *G06F 11/3476* (2013.01); *G06F 11/3034* (2013.01); *G06F 11/3072* (2013.01); *G06F 11/323* (2013.01); *G06F 11/324* (2013.01)

(58) Field of Classification Search
CPC ............. G06F 11/3476; G06F 11/0778; G06F 11/0769
See application file for complete search history.

(56) References Cited

U.S. PATENT DOCUMENTS

| | | | |
|---|---|---|---|
| 7,873,608 B2 | 1/2011 | Desai et al. | |
| 8,032,489 B2 | 10/2011 | Villella et al. | |
| 9,483,583 B2 | 11/2016 | Braun et al. | |
| 9,953,185 B2 | 4/2018 | Bendersky et al. | |
| 10,114,148 B2 | 10/2018 | Ning et al. | |
| 10,133,741 B2 | 11/2018 | Hahn et al. | |
| 10,462,024 B1 | 10/2019 | Kavanagh et al. | |
| 2002/0161673 A1* | 10/2002 | Lee ................... | G06Q 30/02 709/224 |
| 2008/0104094 A1 | 5/2008 | Cowham et al. | |
| 2009/0063395 A1 | 3/2009 | Klump et al. | |
| 2013/0132347 A1 | 5/2013 | Chen | |
| 2015/0135320 A1 | 5/2015 | Coskun | |
| 2016/0246830 A1 | 8/2016 | Chiu et al. | |
| 2018/0089331 A1 | 3/2018 | Long et al. | |
| 2018/0150554 A1 | 5/2018 | Le et al. | |
| 2018/0307576 A1 | 10/2018 | Debnath et al. | |
| 2020/0019484 A1* | 1/2020 | Kolesnik ........... | G06F 40/211 |
| 2020/0160230 A1* | 5/2020 | Wang ................ | G06N 5/003 |

FOREIGN PATENT DOCUMENTS

CN         105049287 A      11/2015

OTHER PUBLICATIONS

Non-Final Office Action for U.S. Appl. No. 16/036,333, dated Dec. 11, 2019, 14 pages.

(Continued)

*Primary Examiner* — Charles Ehne
(74) *Attorney, Agent, or Firm* — Withrow & Terranova, PLLC

(57) ABSTRACT

Log record analysis based on log record templates is disclosed. A plurality of log records that comprise log data generated by one or more logging entities over a period of time is accessed. Each log record of the plurality of log records corresponds to one log record template of a plurality of different log record templates. The log records are analyzed to determine a particular log record template of the plurality of different log record templates to which a majority of the plurality of log records corresponds. An action is taken that is at least partially based on the particular log record template.

20 Claims, 14 Drawing Sheets

(56) References Cited

OTHER PUBLICATIONS

Non-Final Office Action for U.S. Appl. No. 16/036,333, dated Oct. 16, 2020, 25 pages.
Author Unknown, "Log Parsing," Log Parsing Features, xpolog.com/all-features/log-parsing#Regular_Expression, Accessed on Apr. 30, 2018, XpoLog LTD., 6 pages.
Author Unknown, "Parsing Logs," Scalyr, www.scalyr.com/help/parsing-logs, Accessed on Apr. 30, 2018, 21 pages.
Author Unknown, "Regular expression for Apache log parsing," Statistical Modeling, statmodeling.com/regular-expression-for-apache-log-parsing.html, Oct. 22, 2013, 6 pages.
Author Unknown, "Webpack Extract Translation Keys Plugin (Regex version)," Version 1.0.1, www.npmjs.com/package/webpack-extract-translation-keys-regex-plugin, Accessed on Apr. 30, 2018, 10 pages.
Debnath, Biplob, et al., "Fast Log Analysis Made Easy by Automatically Parsing Heterogeneous Logs," LISA17, Oct. 29-Nov. 3, 2017, San Francisco, California, 45 pages.
Nguyen, Thu, "How to Graph Logs & Visualize Data for Proper Log Analysis," logdna.com/blog/how-to-visualize-your-log-data/, Sep. 7, 2018, LogDNA, 10 pages.
Final Office Action for U.S. Appl. No. 16/036,333, dated May 29, 2020, 14 pages.
Advisory Action for U.S. Appl. No. 16/036,333, dated Aug. 11, 2020, 3 pages.
Notice of Allowance for U.S. Appl. No. 16/036,333, dated Feb. 19, 2021, 9 pages.

* cited by examiner

LOG RECORD ANALYSIS BASED ON LOG RECORD TEMPLATES

TECHNICAL FIELD

The examples relate generally to log files and log records, and in particular to log record analysis based on log record templates.

BACKGROUND

Log records generated by an information technology system may contain a wealth of information regarding practically all aspects of the information technology system. Consequently, it is common to analyze log records for any of a number of reasons, such as, by way of non-limiting example, to ascertain how a problem with the information technology system occurred.

SUMMARY

The examples disclosed herein utilize log record templates to analyze a group of log records to determine a particular log record template to which a majority of the plurality of log records corresponds. An action is then taken that is at least partially based on the particular log record template.

In one example a method is provided. The method includes accessing a plurality of log records that comprise log data generated by one or more logging entities over a period of time, wherein each log record of the plurality of log records corresponds to one log record template of a plurality of different log record templates. The method further includes analyzing the log records to determine a particular log record template of the plurality of different log record templates to which a majority of the plurality of log records corresponds. The method further includes taking an action that is at least partially based on the particular log record template.

In another example a computing device is provided. The computing device includes a memory and a processor device coupled to the memory. The processor device is to access a plurality of log records that comprise log data generated by one or more logging entities over a period of time, wherein each log record of the plurality of log records corresponds to one log record template of a plurality of different log record templates. The processor device is further to analyze the log records to determine a particular log record template of the plurality of different log record templates to which a majority of the plurality of log records corresponds. The processor device is further to take an action that is at least partially based on the particular log record template.

In another example a computer program product is provided. The computer program product is stored on a non-transitory computer-readable storage medium and includes instructions to cause a processor device to access a plurality of log records that comprise log data generated by one or more logging entities over a period of time, wherein each log record of the plurality of log records corresponds to one log record template of a plurality of different log record templates. The instructions further cause the processor device to analyze the log records to determine a particular log record template of the plurality of different log record templates to which a majority of the plurality of log records corresponds. The instructions further cause the processor device to take an action that is at least partially based on the particular log record template.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
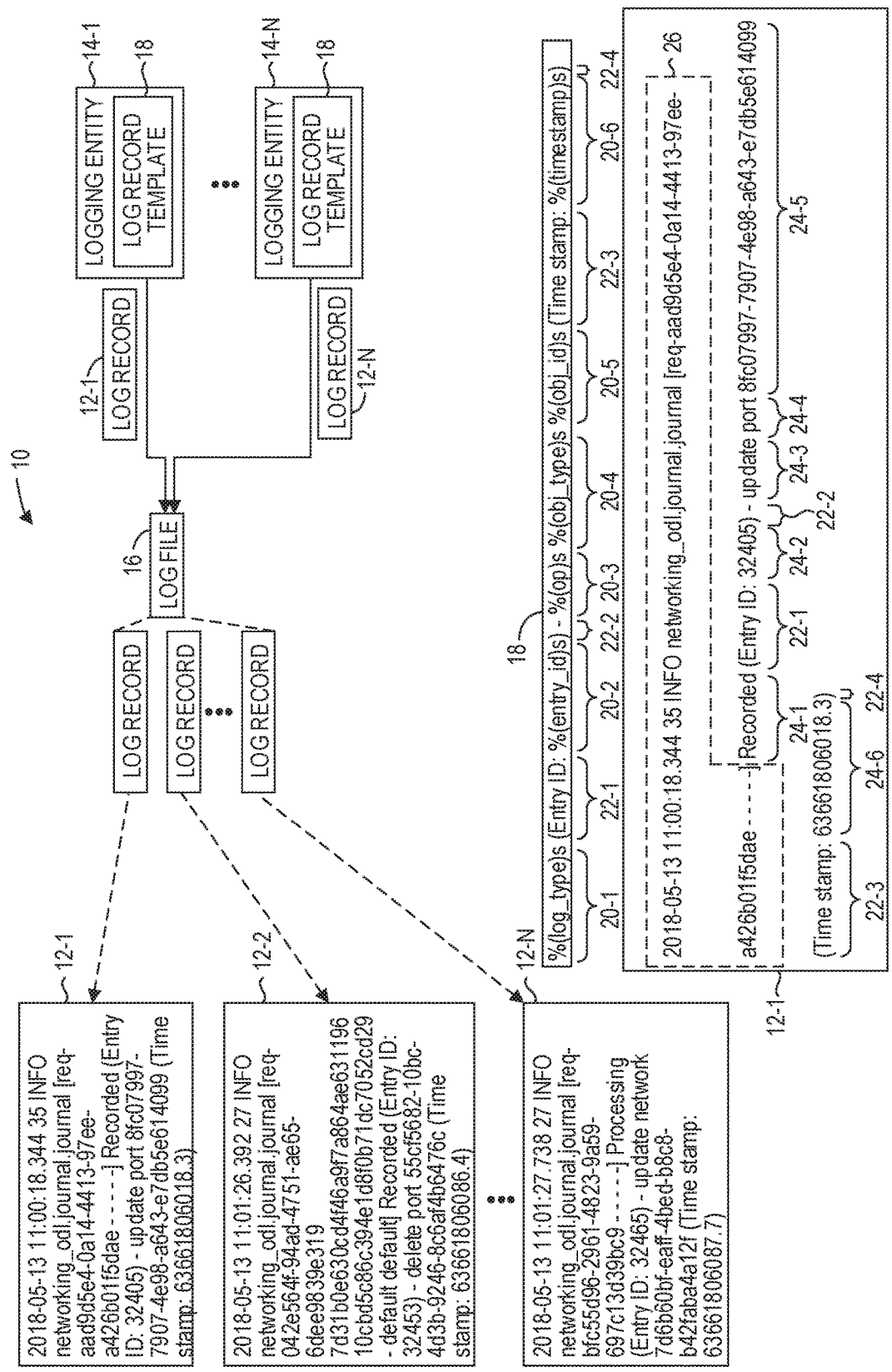
FIG. 1 is a block diagram of an environment illustrating the generation of a plurality of log records according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Log records are often analyzed by ascertaining a log record layout of a log record and then generating regular expressions (regex) that parse log records and extract desired fields from the log record. Unfortunately, the regular expressions must be generated for each different log record layout, for each different spoken language in which the log records may have been generated, and each time the log record layout changes. Moreover, generating regular expressions requires a certain amount of specialized knowledge that may not be available upon demand.

The examples automatically, and in some examples without human involvement, generate parsing instructions, using a regex or the like, to extract log data items from a log record based on log record template data associated with a log record template used to generate the log records. The log record template comprises a plurality of field identifiers for a log record. The examples also generate a map that, for each analyzed log record, identifies the field identifiers of the log record template and the corresponding log data items from the log record. Among other advantages, the examples eliminate a need for a human to generate log record analysis instructions for each different version of a log record, and for each different written language in which a log record is created, saving time and costs associated with log record analysis.

A log file can contain a multitude of log records, such as thousands, tens of thousands, or even more. Each log record is generated by a set of logging instructions in accordance with a particular log record template. The sets of logging instructions may be located throughout a logging entity, such that some sets of logging instructions are executed more frequently than other sets of logging instructions, and thus the number of log records generated in accordance with different log record templates typically varies. Sometimes, log records generated in accordance with only one or a few log record templates may be so numerous that it is difficult to locate log records generated in accordance with other log record templates, which can increase the time it may take to identify the source of a problem.

Often a set of logging instructions may be generating a substantially larger quantity of log records than expected or desired. This may not be appreciated until a problem occurs and a log file is analyzed, only to find that there are a substantial number of log records that are not useful, which can make locating useful log records difficult. Additionally, excessive logging increases storage space required to store log files, overutilizes finite network bandwidth, and increases problem resolution time.

Some of the examples disclosed herein utilize log record templates to analyze a group of log records to determine a particular log record template to which a majority of the plurality of log records corresponds. An action is then taken that is at least partially based on the particular log record template.

FIG. 1 is a block diagram of an environment 10 illustrating the generation of a plurality of log records 12-1-12-N (generally, log records 12) according to one example. The environment 10 may include a plurality of different logging entities 14-1-14-N (generally, logging entities 14), each of which may be programmed to generate a log record 12 upon the occurrence of an event, after a period of time, or in response to any other desired criteria. The log records 12 may be stored in one or more log files 16. The logging entities 14 utilize a log record template 18 to generate the log records 12. The log record template 18 includes a plurality of field identifiers 20-1-20-6. When generating a log record 12, a logging entity 14 replaces the field identifiers 20-1-20-6 with corresponding log data items. The log record template 18 may also include one or more textual strings 22-1-22-4, which are also stored in the log record 12, typically in conjunction with a particular log data item. The logging entity 14 may comprise, by way of non-limiting example, an application or other process executing on a computing device.

As an example, the log record 12-1 includes a plurality of log data items 24-1-24-6 which correspond, respectively, to the field identifiers 20-1-20-6. For example, the log data item 24-1 corresponds to the field identifier 20-1, and the log data item 24-6 corresponds to the field identifier 20-6. The log record 12-1 also includes the textual strings 22-1-22-4 from the log record template 18.

In this example the log records 12 also include logging metadata 26 which may have a separate and different format from the log record template 18, and may be a constant format irrespective of the particular log record template 18 used by a logging entity 14. The logging metadata 26 may be generated by the logging entity 14, or by another entity to which the logging entity 14 sends the information that the logging entity 14 generated from the log record template 18. While the examples discussed herein operate on the log record data other than the logging metadata 26, the examples may also be used to extract desired information from the logging metadata 26 using the same principles discussed herein.

Figure 2:
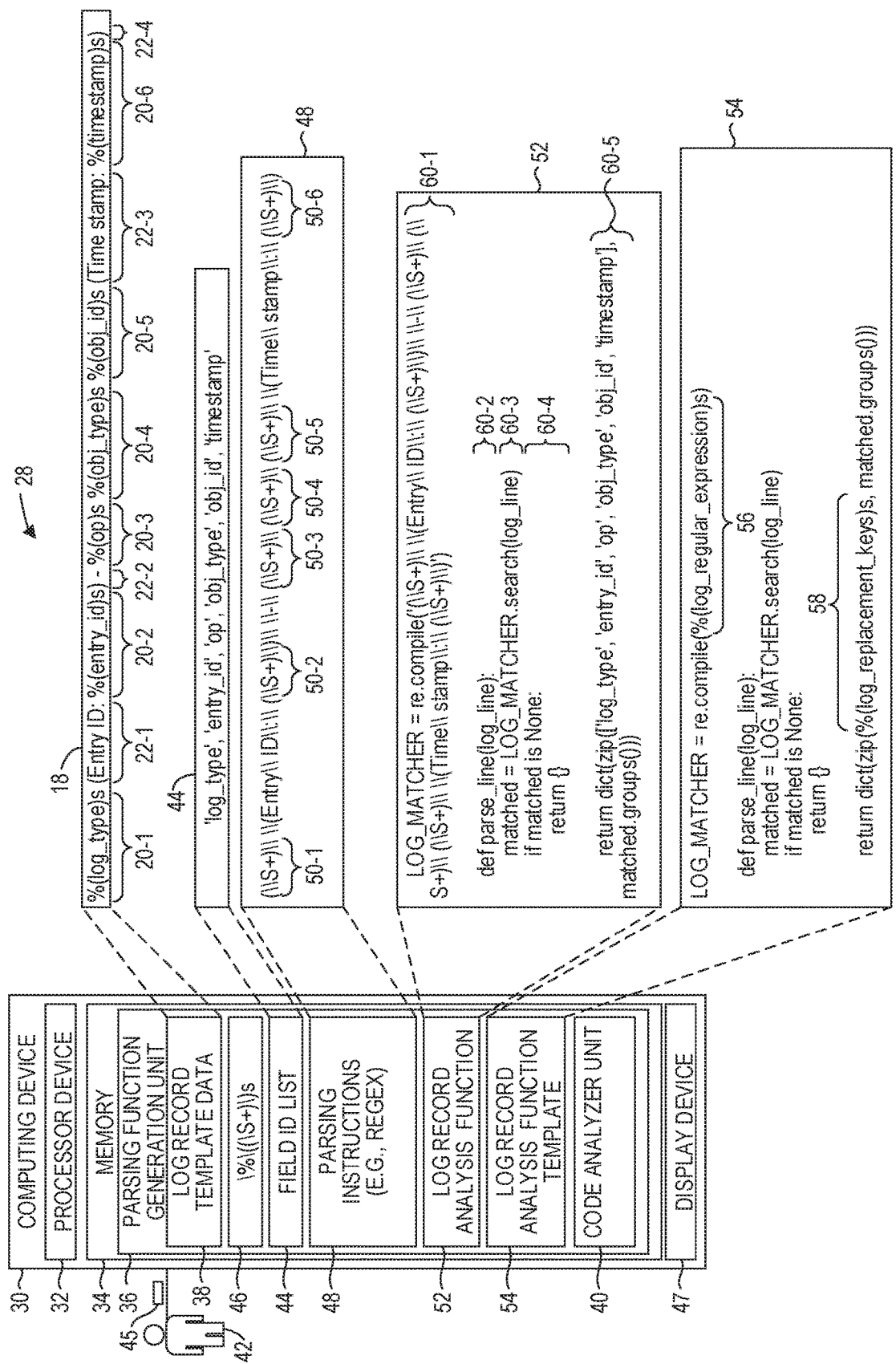
FIG. 2 is a block diagram of an environment illustrating aspects of the examples utilizing the log records illustrated in FIG. 1.

FIG. 2 is a block diagram of an environment 28 illustrating aspects of the examples utilizing the log records 12 illustrated in FIG. 1. The environment 28 includes a computing device 30, such as a Linux workstation or the like. The computing device 30 includes a processor device 32 and a memory 34. The memory 34 includes a parsing function generation unit 36, which, in this example, comprises a plurality of complex executable instructions that program the processor device 32 to implement the functionality described herein. In other examples, the parsing function generation unit 36 may be implemented in circuitry, such as an application specific integrated circuitry (ASIC), or the like. Because the parsing function generation unit 36 is a component of the computing device 30, functionality implemented by the parsing function generation unit 36 may be attributed herein to the computing device 30 generally. Moreover, in examples where the parsing function generation unit 36 comprises software instructions that program the processor device 32 to carry out functionality discussed herein, functionality implemented by the parsing function generation unit 36 may be attributed herein to the processor device 32.

For purposes of illustration and discussion, the examples will be discussed herein in the context of the log record template 18; however, the examples may utilize any log record template. The parsing function generation unit 36 receives, as input, log record template data 38 associated with the log record template 18, which comprises the plurality of field identifiers 20-1-20-6 for a log record 12. The log record template data 38 may comprise any data from which the plurality of field identifiers 20-1-20-6 may be identified. For example, the log record template data 38 may comprise the log record template 18. In another example, the log record template data 38 may comprise a plurality of instructions of a program that generates log records 12 using the log record template 18, such as the instructions that compose the logging entity 14-1. In one example, a code analyzer unit 40 may analyze the plurality of instructions to identify the plurality of field identifiers 20-1-20-6. In one example, the instructions may comprise source code statements (i.e., instructions) written in a particular programming language, such as Python, C++, or the like, and the code analyzer unit 40 analyzes the source code statements to identify those that relate to generating a log record 12, and extracts from such statements the field identifiers 20-1-20-6. One example of such source code statements is provided below:

```
def_log_entry(log_type, entry, log_level=logging.INFO, **kwargs):
    delta=datetime.now( )–datetime.min
    timestamp=delta.total_seconds( )
    log_dict={'log_type': log_type, 'op': entry.operation,
    'obj_type': entry.object_type, 'obj_id': entry.object_uuid,
    'entry_id': entry.seqnum, 'timestamp': timestamp}
    LOG.log(log_level, LOG_ENTRY_TEMPLATE, log_dict, **kwargs)
```

The above function may then be invoked at various locations throughout the program, such as the following example invocations:

_log_entry('Recorded', entry)
_log_entry('Processing', entry)
_log_entry('Completed', entry)
_log_entry('Error while processing', entry,
    _log_level=logging.ERROR, exc_info=True)

In another example, the instructions may comprise executable code statements, and the code analyzer unit 40 analyzes the executable code statements, such as via static code analysis or the like, to identify the field identifiers 20-1-20-6.

In this example, the log record template data 38 comprises the log record template 18. In one example, the parsing function generation unit 36 may present a user interface to a user 42, and the user 42 may designate a location on a storage device of the log record template 18. The parsing function generation unit 36 analyzes the log record template 18 to identify the plurality of field identifiers 20. The parsing function generation unit 36 may generate a field identifier (ID) list 44 that contains the plurality of field identifiers 20.

In one example, the parsing function generation unit 36 uses a regular expression (regex) 46 to parse the log record template 18 to extract the plurality of field identifiers 20 from the log record template 18. The phrase "regular expression" as used herein refers to a sequence of characters that define a search pattern. In one example, the parsing function generation unit 36 receives, from the user 42, user input 45 that identifies a regular expression that defines a search pattern, and the parsing function generation unit 36 processes the log record template 18 with the regular expression to extract the plurality of field identifiers 20.

In this example, the regex 46 is based on field demarcation characters of "%(" that precedes each field identifier 20, and field demarcation characters of ")s" that precede each field identifier 20. However, in other examples, other demarcation characters may be used, and the regex 46 would then search for such other demarcation characters in the log record template 18.

In other examples, the environment 10 (FIG. 1) may utilize a number of different predetermined logging formats, and the parsing function generation unit 36 presents, on a display device 47, the plurality of different logging formats to the user 42. Each different logging format corresponds to a particular predetermined regular expression of a plurality of different regular expressions. The parsing function generation unit 36 receives user input from the user 42 that identifies a particular logging format of the plurality of logging formats, and the parsing function generation unit 36 processes the log record template 18 with the regular expression that corresponds to the particular logging format to extract the plurality of field identifiers 20.

The parsing function generation unit 36, based on the log record template data, automatically generates parsing instructions 48 configured to extract a plurality of log data items 24 from a log record 12 that was generated based on the log record template 18. Each log data item 24 corresponds to one of the plurality of field identifiers 20. In one example the parsing instructions 48 comprise a regular expression that defines a search pattern based on the field identifiers 20 in the log record template 18. The regular expression includes a plurality of capture groups 50-1-50-6 (generally, capture groups 50), each capture group 50 corresponding to one of the field identifiers 20 in the log record template 18 and configured to extract from a log record 12 a log data item 24 in the log record 12 that corresponds to the field identifier 20. If the log record template 18 includes one or more textual strings 22, the parsing instructions 48 may also match against the one or more textual strings 22 contained in a log record 12. As used herein, the phrase "capture group" refers to a regular expression group of characters that match against a defined sequence of characters and, if a match exists, extracts the defined sequence of characters into a list.

In one example, the parsing function generation unit 36 may then access, or otherwise be provided, a log record 12 that was generated based on the log record template 18 to the parsing instructions 48. The parsing function generation unit 36 provides the log record 12 to the parsing instructions 48. For example, the parsing function generation unit 36 processes the log record 12 with the parsing instructions 48 using an appropriate regex function call. If the parsing instructions 48 match the log record 12, then the parsing function generation unit 36 then outputs information, which identifies the plurality of field identifiers 20 and the plurality of log data items 24, from the log record 12. The information may also include the textual strings 22.

In another example, rather than processing log records 12, the parsing function generation unit 36, based on the log record template data 38 and the plurality of field identifiers 20, automatically generates a log record analysis function 52 that is configured to receive a log record 12 that was generated based on the log record template 18, extract a plurality of log data items 24 from the log record 12, each log data item 24 corresponding to one of the plurality of field identifiers 20, and output information that identifies the plurality of field identifiers 20 and the plurality of log data items 24 from the log record 12. The log record analysis function 52 may then be used subsequently to process any number of log records 12 as desired.

In one example, to generate the log record analysis function 52, the parsing function generation unit 36 accesses a log record analysis function template 54 that includes a regular expression field 56 and a field identifier field 58. The log record analysis function 52 replaces the regular expression field 56 with the parsing instructions 48, and replaces the field identifier field 58 with the plurality of field identifiers 20.

In one example, the log record analysis function 52 is generated in the Python programming language, and comprises instructions 60-1 that are configured to, when executed, call a regex function with the parsing instructions 48 to compile the parsing instructions 48. The log record analysis function 52 includes instructions 60-2 that are configured to receive a log record 12. The log record analysis function 52 includes instructions 60-3 that are configured to determine if the parsing instructions 48 match the log record 12. If there is no match, the instructions 60-4 return with no log data items 24 from the log record 12. The parsing instructions 48, for example, may not match a log record 12 that was generated based on a different log record template than the log record template 18. If the parsing instructions 48 match the log record 12, instructions 60-5 return the field identifiers 20 in association with the log data items 24 in the log record 12. As will be illustrated below, in one example the output comprises a key-value map wherein each key comprises a different one of the field identifiers 20 and wherein each value comprises the log data item 24 from the log record 12 that corresponds to the different one of the field identifiers 20.

Figure 3:
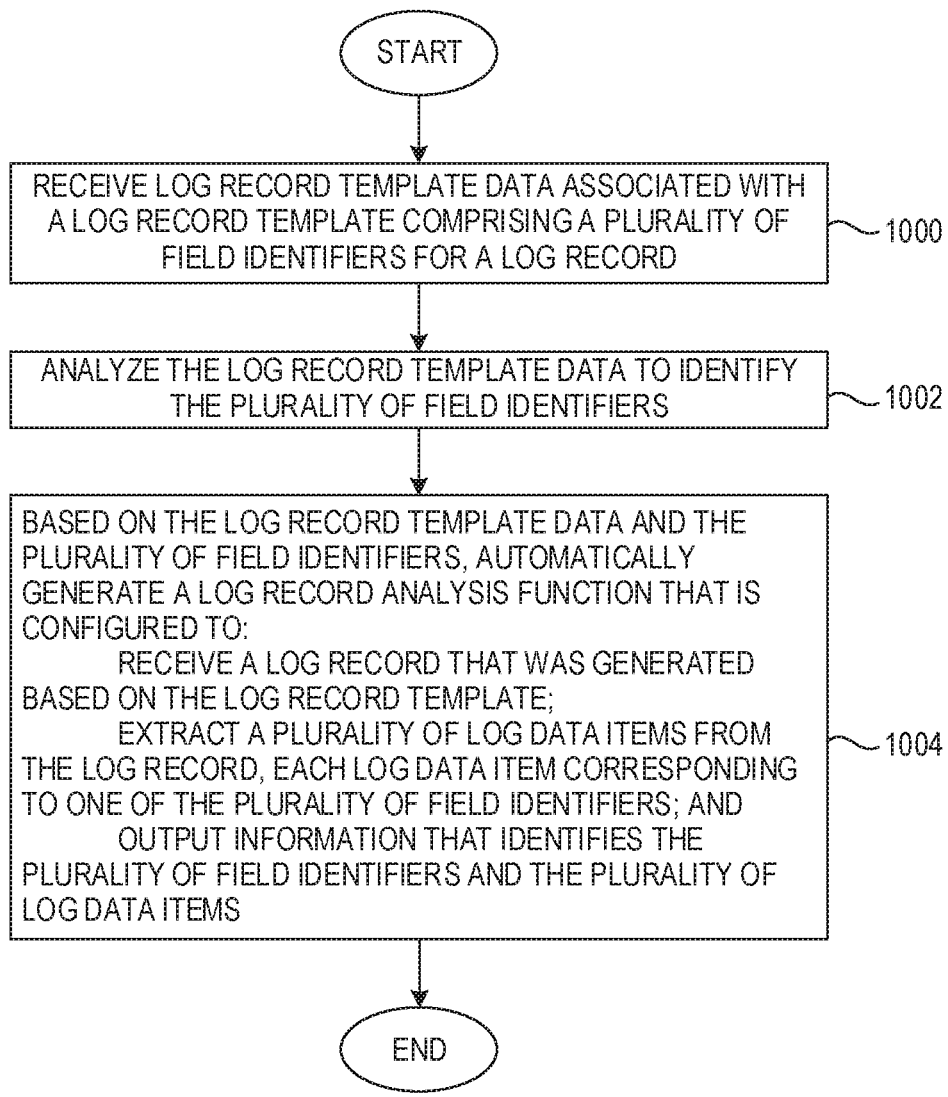
FIG. 3 is a flowchart of a method for generating a log record analysis function according to one example.

FIG. 3 is a flowchart of a method for generating the log record analysis function 52 according to one example. FIG. 3 will be discussed in conjunction with FIG. 2. The parsing function generation unit 36 receives the log record template data 38 associated with the log record template 18, which comprises the plurality of field identifiers 20 for a log record 12 (FIG. 3, block 1000). The parsing function generation unit 36 analyzes the log record template data 38 to identify the plurality of field identifiers 20 (FIG. 3, block 1002). Based on the log record template data 38 and the plurality of field identifiers 20, the parsing function generation unit 36 automatically generates the log record analysis function 52 that is configured to receive a log record 12 that was generated based on the log record template 18, extract a plurality of log data items 24 from the log record 12, each log data item 24 corresponding to one of the plurality of field identifiers 20, and output information that identifies the plurality of field identifiers 20 and the plurality of log data items 24 from the log record 12.

Figure 4:
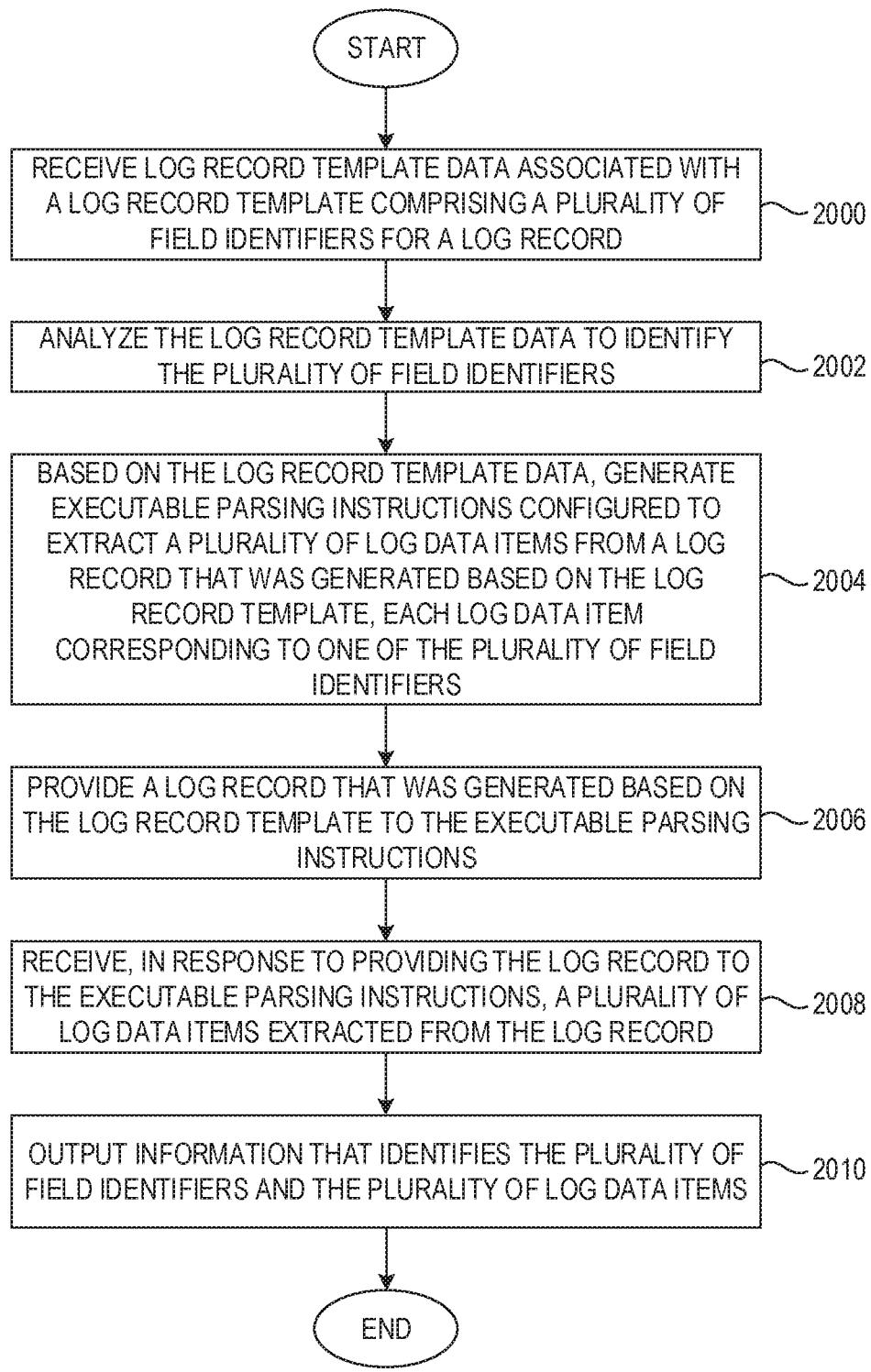
FIG. 4 is a flowchart of a method for automatically analyzing log records based on the log record template data according to one example.

FIG. 4 is a flowchart of a method for automatically analyzing log records based on the log record template data 38 according to one example. FIG. 4 will be discussed in conjunction with FIG. 2. In this example, the parsing function generation unit 36 receives the log record template data 38 associated with the log record template 18, which comprises the plurality of field identifiers 20 for a log record 12 (FIG. 4, block 2000). The parsing function generation unit 36 analyzes the log record template data 38 to identify the plurality of field identifiers (FIG. 4, block 2002). The parsing function generation unit 36, based on the log record template data 38, generates executable parsing instructions 48 configured to extract the plurality of log data items 24 from a log record 12 that was generated based on the log record template 18. Each log data item 24 corresponds to one of the plurality of field identifiers 20 (FIG. 4, block 2004). The parsing function generation unit 36 provides a log record 12 that was generated based on the log record template 18 to the executable parsing instructions 48 (FIG. 4, block 2006). The parsing function generation unit 36 receives, in response to providing the log record 12 to the executable parsing instructions 48, a plurality of log data items 24 extracted from the log record 12 (FIG. 4, block 2008). The parsing function generation unit 36 outputs information that identifies the plurality of field identifiers 20 and the plurality of log data items 24 from the log record 12 (FIG. 4, block 2010).

Figure 5:
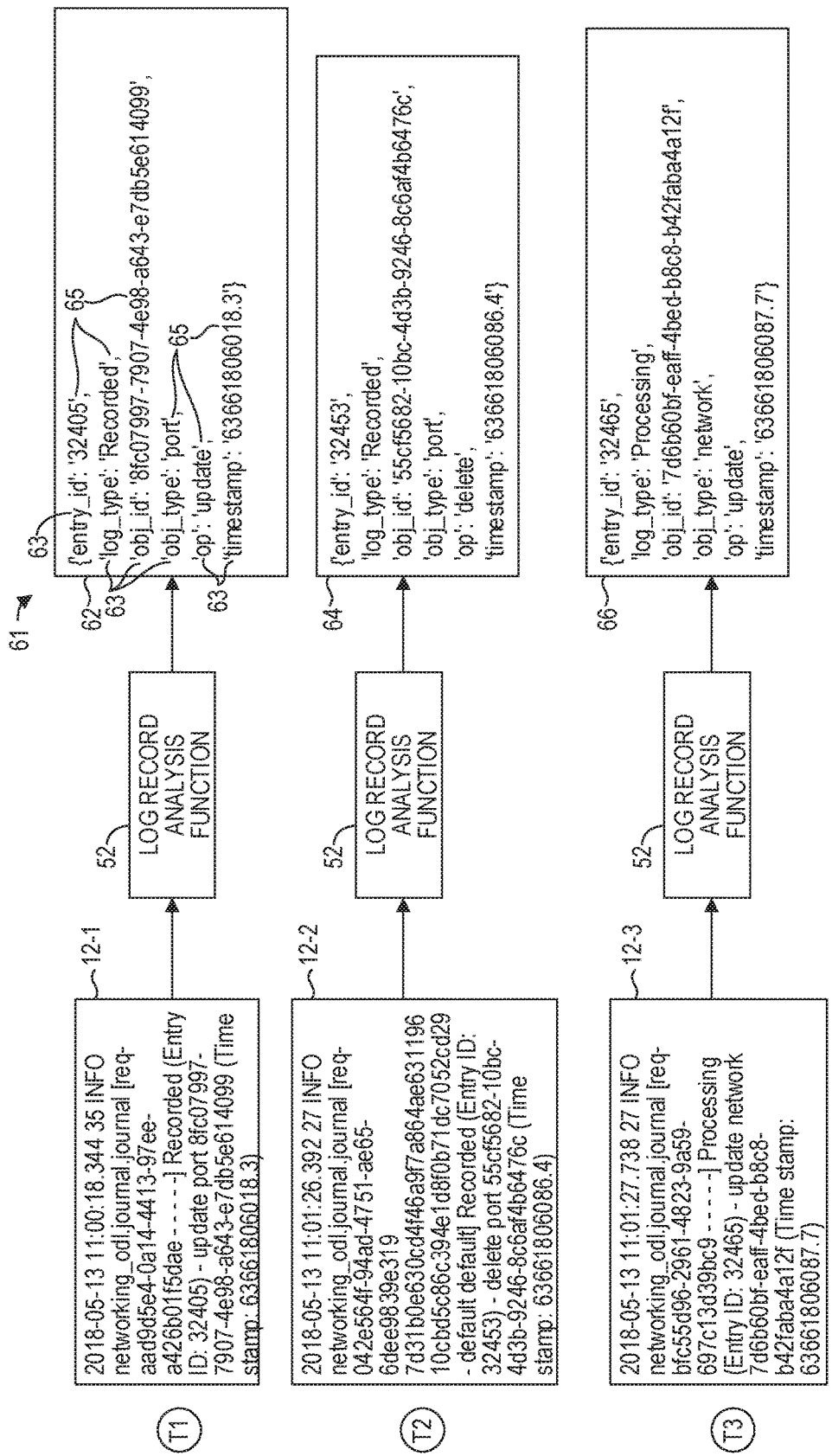
FIG. 5 is a block diagram illustrating a log record analysis function processing a plurality of log records according to one example.

FIG. 5 is a block diagram illustrating the log record analysis function 52 processing a plurality of log records 12 according to one example. The log record analysis function 52 may execute on the computing device 30, or on another computing device. At a time T1, the log record analysis function 52 receives the log record 12-1. In one example, the log record analysis function 52 may be utilized in conjunction with another function that reads log records 12 from a log file, and passes each log record 12 to the log record analysis function 52. The log record analysis function 52 extracts the plurality of log data items 24 from the log record 12-1. The log record analysis function 52 generates and outputs information 61, which in this example is a key-value map 62 wherein each key 63 comprises a different one of the field identifiers 20, and each value 65 comprises the log data item 24 from the log record 12-1 that corresponds to the different one of the field identifiers 20.

Similarly, at a time T2, the log record analysis function 52 receives the log record 12-2. The log record analysis function 52 extracts the plurality of log data items 24 from the log record 12-2. The log record analysis function 52 generates and outputs a key-value map 64 wherein each key comprises a different one of the field identifiers 20, and each value comprises the log data item 24 from the log record 12-1 that corresponds to the different one of the field identifiers 20.

Similarly, at a time T3, the log record analysis function 52 receives a log record 12-3. The log record analysis function 52 extracts the plurality of log data items 24 from the log record 12-3. The log record analysis function 52 generates and outputs a key-value map 66 wherein each key comprises a different one of the field identifiers 20, and each value comprises the log data item 24 from the log record 12-3 that corresponds to the different one of the field identifiers 20.

Figure 6:
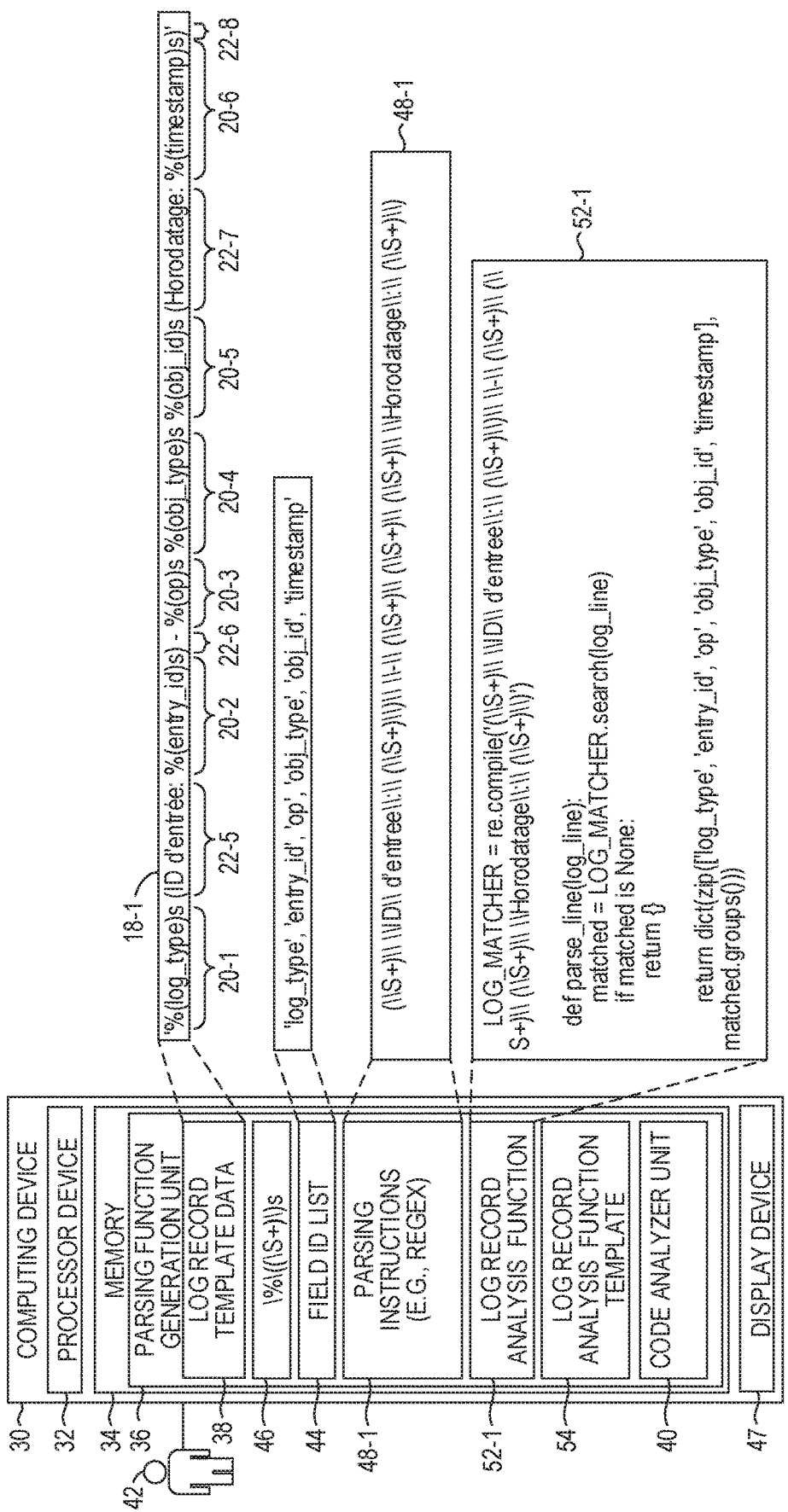
FIG. 6 is a block diagram of a computing device utilizing a log record template written in French rather than English according to one example.

In some international information technology environments, log records 12 may contain words in different written languages, such as English, French or Spanish, depending on the country in which the log record 12 is generated. In such environments, the log record template 18 may be similar or identical in each country, except for certain words, such as the textual strings 22, which are translated to the corresponding words in the particular language. FIG. 6 is a block diagram of the computing device 30 utilizing a log record template 18-1, except the textual strings 22 are written in French rather than English.

The parsing function generation unit 36 receives, as input, the log record template 18-1. The log record template 18-1 comprises the plurality of field identifiers 20-1-20-6, and textual strings 22-5-22-8. Note that the textual strings 22-5 and 22-7 are in the French language rather than English. The parsing function generation unit 36 uses the regular expression (regex) 46 to parse the log record template 18-1 to extract the plurality of field identifiers 20 from the log record template 18-1. Note that because the same field demarcation identifiers are used in both the English and French versions, the regex 46 does not differ.

The parsing function generation unit 36, based on the log record template 18-1, automatically generates parsing instructions 48-1 configured to extract a plurality of log data items 24 from a log record 12 that was generated based on the log record template 18-1. Each log data item 24 corresponds to one of the plurality of field identifiers 20. Note that the parsing instructions 48-1 are substantially similar to the parsing instructions 48, except for the use of French textual strings identified in the log record template 18-1.

The parsing function generation unit 36, based on the log record template 18-1 and the plurality of field identifiers 20, automatically generates a log record analysis function 52-1 that is configured to receive a log record 12 that was generated based on the log record template 18-1, extract a plurality of log data items 24 from the log record 12, each log data item 24 corresponding to one of the plurality of field identifiers 20, and output information that identifies the plurality of field identifiers 20 and the plurality of log data items 24 from the log record 12. The log record analysis function 52 may then be used subsequently to process any number of log records 12 as desired.

In one example, to generate the log record analysis function 52, the parsing function generation unit 36 accesses the log record analysis function template 54 that includes a regular expression field 56 and a field identifier field 58. The log record analysis function 52 replaces the regular expression field 56 with the parsing instructions 48-1, and replaces the field identifier field 58 with the plurality of field identifiers 20.

Figure 7:
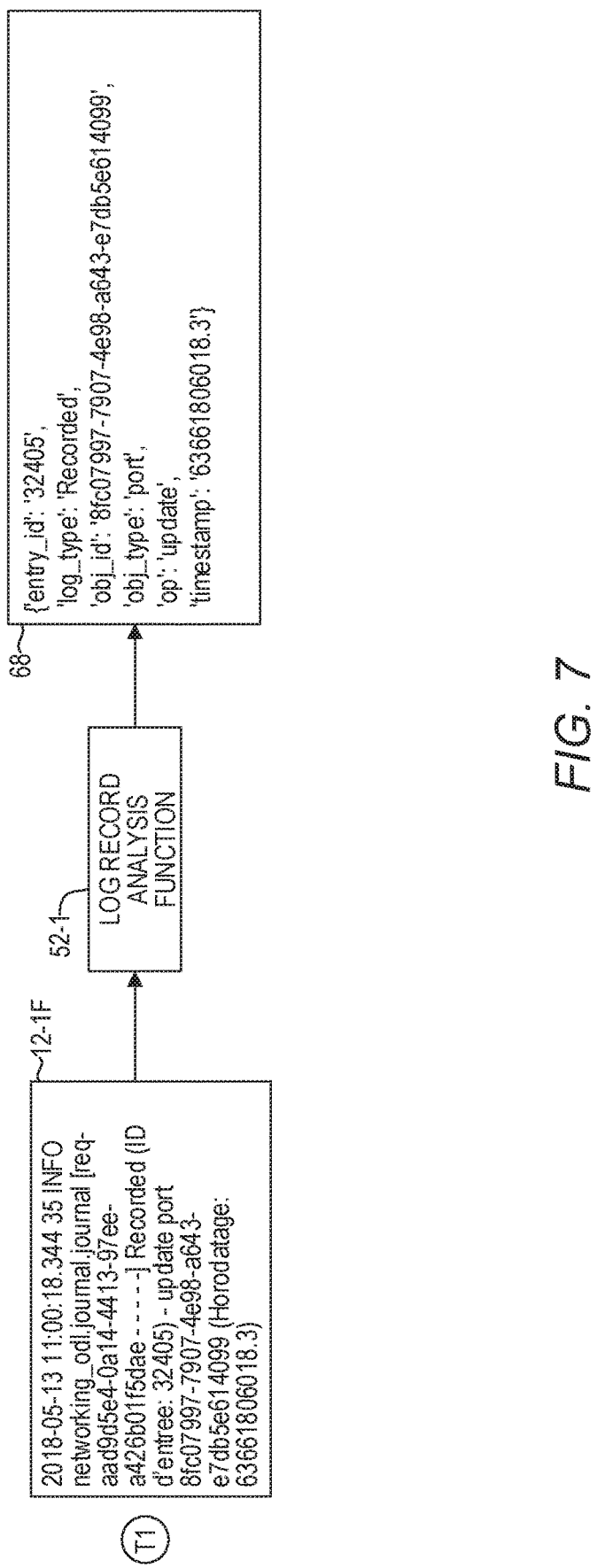
FIG. 7 is a block diagram illustrating a log record analysis function processing a log record according to another example.

FIG. 7 is a block diagram illustrating the log record analysis function 52-1 processing a log record 12-1F generated based on the log record template 18-1. At a time T1, the log record analysis function 52-1 receives the log record 12-1F. The log record analysis function 52-1 extracts the plurality of log data items 24 from the log record 12-1F. The log record analysis function 52-1 generates and outputs a key-value map 68 wherein each key comprises a different one of the field identifiers 20, and each value comprises the log data item 24 from the log record 12-1F that corresponds to the different one of the field identifiers 20.

Figure 8:
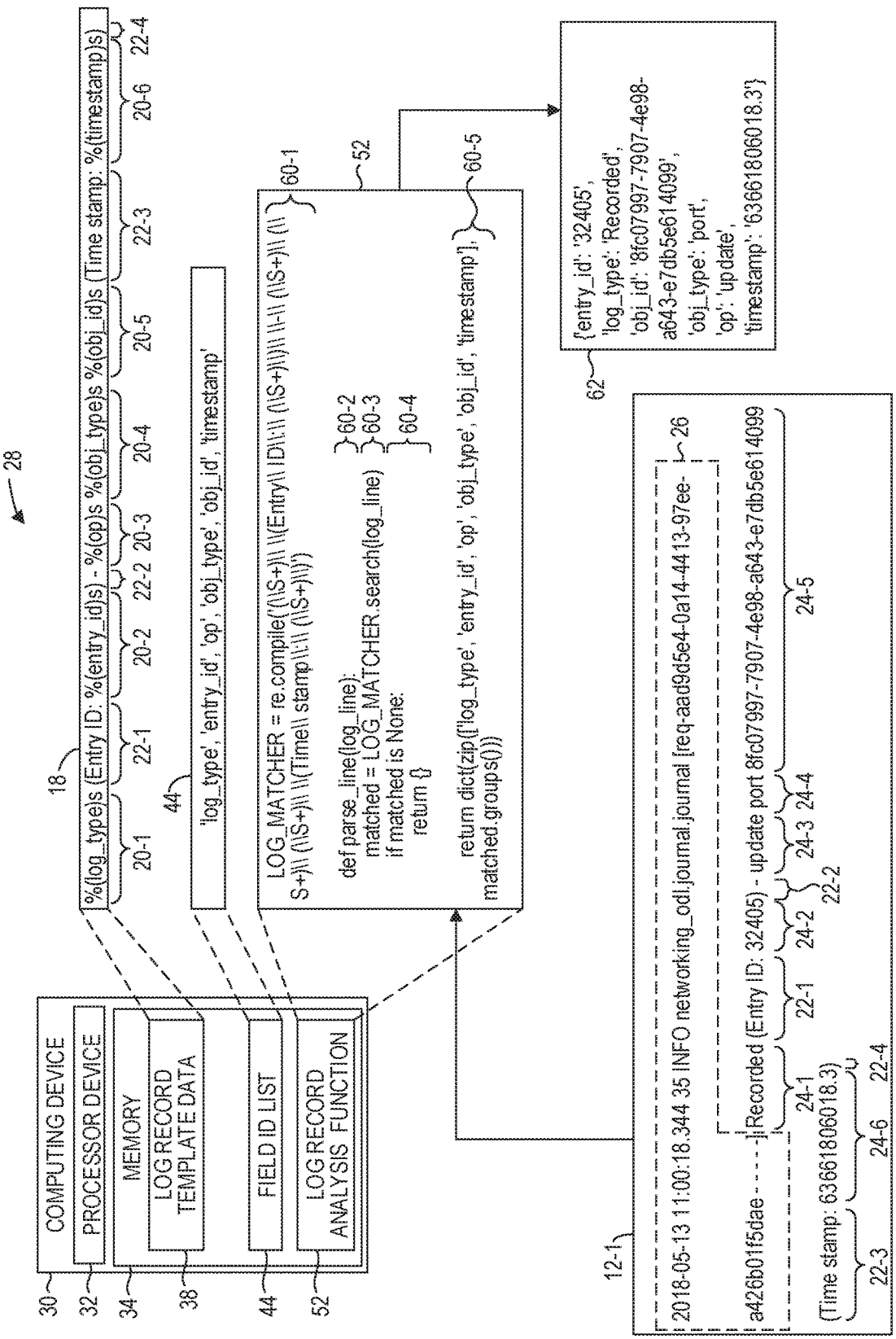
FIG. 8 is a simplified block diagram of the computing device illustrated in FIG. 2 according to one example.

FIG. 8 is a simplified block diagram of the computing device 30 illustrated in FIG. 2 according to one example. The computing device 30 includes the memory 34 and the processor device 32 that is coupled to the memory 34. The processor device 32 receives the log record template data 38 associated with the log record template 18 comprising a plurality of field identifiers 20 for a log record 12. The processor device 32 analyzes the log record template data 38 to identify the plurality of field identifiers 20. Based on the log record template data 38 and the plurality of field identifiers 20, the processor device 32 automatically generates the log record analysis function 52 that is configured to receive the log record 12-1 that was generated based on the log record template 18, extract a plurality of log data items 24 from the log record 12-1, each log data item 24 corresponding to one of the plurality of field identifiers 20, and output information, such as the key-value map 62, that identifies the plurality of field identifiers 20 and the plurality of log data items 24 from the log record.

Figure 9:
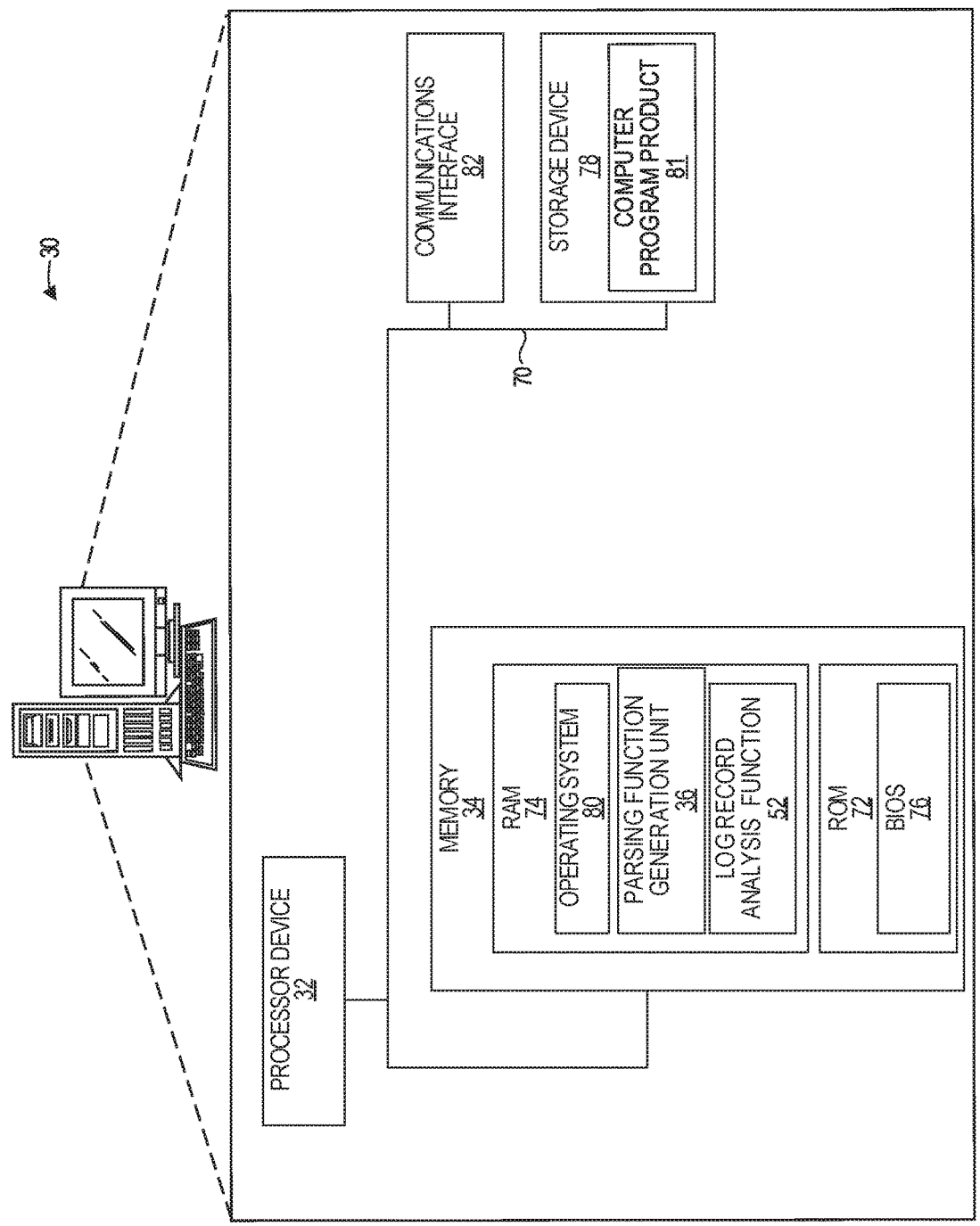
FIG. 9 is a block diagram of a computing device suitable for implementing examples according to one example.

FIG. 9 is a block diagram of the computing device 30 suitable for implementing examples according to one example. The computing device 30 may comprise any computing or electronic device capable of including firmware, hardware, and/or executing software instructions to implement the functionality described herein, such as a computer server, a desktop computing device, a laptop computing device, or the like. The computing device 30 includes the processor device 32, the memory 34, and a system bus 70. The system bus 70 provides an interface for system components including, but not limited to, the memory 34 and the processor device 32. The processor device 32 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The memory 34 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing device 30. The volatile memory 74 may also include a high-speed RAM, such as static RAM, for caching data.

The computing device 30 may further include or be coupled to a non-transitory computer-readable storage medium such as a storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 78 and in the volatile memory 74, including an operating system 80 and one or more program units, such as the parsing function generation unit 36 and the log record analysis function 52, which may implement the functionality described herein in whole or in part.

All or a portion of the examples may be implemented as a computer program product 81 stored on a transitory or non-transitory computer-usable or computer-readable storage medium, such as the storage device 78, which includes complex programming instructions, such as complex computer-readable program code, to cause the processor device 32 to carry out the steps described herein. Thus, the computer-readable program code can comprise software instructions for implementing the functionality of the examples described herein when executed on the processor device 32. The processor device 32, in conjunction with the parsing function generation unit 36 in the volatile memory 74, may serve as a controller, or control system, for the computing device 30 that is to implement the functionality described herein. The computing device 30 may also include a communications interface 82 suitable for communicating with a network as appropriate or desired. It is noted that the parsing function generation unit 36 constitutes an improvement to the computer functionality of the computing device 30 itself, since a conventional computing device 30 cannot implement the recited functionality of the parsing function generation unit 36.

Figure 10:
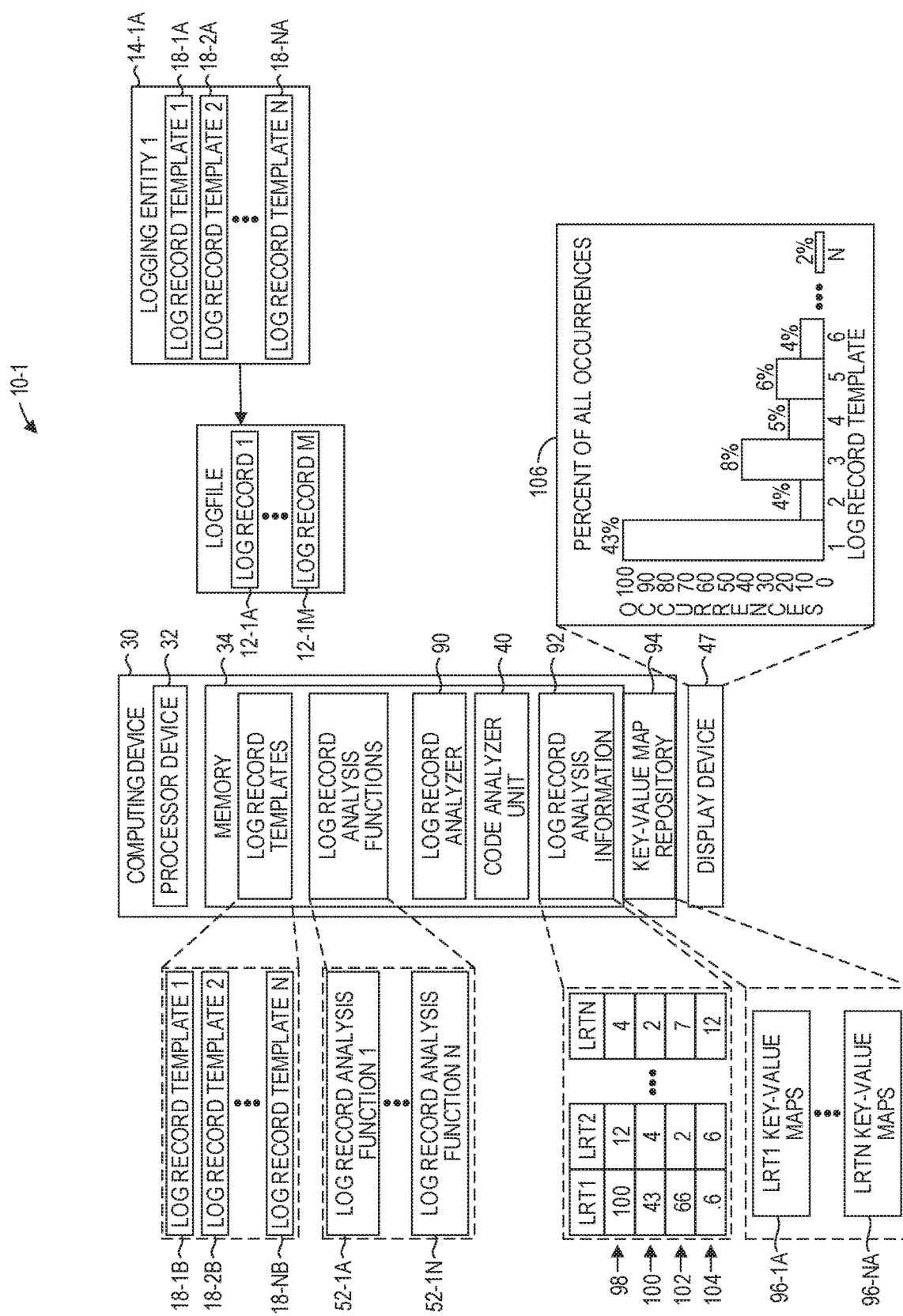
FIG. 10 is block diagram of an environment according to additional implementations.

FIG. 10 is block diagram of an environment 10-1 according to additional implementations. The environment 10-1 includes the computing device 30 illustrated in FIG. 2, although for purposes of space, certain of the components of the computing device 30 have been omitted from FIG. 10. In this example, a logging entity 14-1A generates log records 12-1A-12-1M in accordance with a plurality of different log record templates 18-1A, 18-2A-18-NA. The different log record templates 18-1A, 18-2A-18-NA are implemented via different sets of logging instructions that are located in different locations in the logging entity 14-1A. As used herein, a set of logging instructions are those programming instructions that generate a log record 12 in accordance with a particular log record template 18-1A, 18-2A-18-NA.

The computing device 30 includes a plurality of log record templates 18-1B, 18-2B-18-NB, which correspond respectively to the log record templates 18-1A, 18-2A-18-NA of the logging entity 14-1A. The log record templates 18-1B, 18-2B-18-NB may be identical to the log record templates 18-1A, 18-2A-18-NA, or may comprise data that identifies the content of the log record templates 18-1A, 18-2A-18-NA sufficiently to facilitate the generation of corresponding log record analysis functions 52-1A-52-1N. Mechanisms for generating the log record templates 18-1B, 18-2B-18-NB can be identical to the generation of the log record template data 38, as discussed above.

Each log record analysis function 52-1A-52-1N corresponds to a particular log record template 18-1B, 18-2B-18-NB and, thus, also corresponds to a particular log record template 18-1A, 18-2A-18-NA, and is generated in the manner discussed above with regard to the log record analysis function 52. Each log record analysis function 52-1A-52-1N is configured to match a log record 12 that is generated in accordance with the corresponding log record template 18-1A-18-NA. For example, the log record analysis function 52-1A will match a log record 12-1A-12-1M that is generated in accordance with the log record template 18-1A, but will not match a log record 12-1A-12-1M that is generated in accordance with any of the log record templates 18-2A-18-NA.

If a log record analysis function 52-1A-52-NA matches a particular log record 12-1A-12-1M, the log record analysis function 52-1A-52-NA generates information 61 (FIG. 5), such as a key-value map 62 wherein each key 63 comprises a different one of the field identifiers 20, and each value 65 comprises the log data item 24 from the log record 12-1A-12-1M that corresponds to the different one of the field identifiers 20, as discussed above with regard to FIG. 5, for example.

In this example, a log record analyzer 90 utilizes the log record analysis functions 52-1A-52-1N to analyze the log records 12-1A-12-1M to generate log record analysis information 92. To analyze the log records 12-1A-12-1M, the log record analyzer 90 may, for example, sequentially access each log record 12-1A-12-1M, and for each log record 12-1A-12-1M invoke each log record analysis function 52-1A-52-1N until one of the log record analysis functions 52-1A-52-1N indicates a match. The log record analyzer 90 may then update the log record analysis information 92 based on the log record template 18-1B, 18-2B-18-NB to which the matching log record analysis function 52-1A-52-1N corresponds. The log record analyzer 90 may also, in some implementations, store the key-value map returned by the matching log record analysis function 52-1A-52-1N in a key-value map repository 94, categorized based on the log record template 18-1B, 18-2B-18-NB to which the particular log record analysis function 52-1A-52-1N corresponds. For example, the key-value maps returned from the log record analysis function 52-1A may be stored in a structure 96-1A that corresponds to the log record template 18-1B, and the key-value maps returned from the log record analysis function 52-1N may be stored in a structure 96-NA that corresponds to the log record template 18-NB. The key-value maps, as discussed above with regard to FIG. 5 for example, include the actual log data items from the log records 12-1A-12-1M, and thus the actual content of the log records 12-1A-12-1M may also be analyzed and reports may be generated based on the contents of the log records 12-1A-12-1M.

The log record analyzer 90 may generate any desired log record analysis information 92. As an example, the log record analysis information 92 may include occurrence information 98 that maintains a count of the occurrences (e.g., quantity) of each log record 12-1A-12-1M that corresponds to a particular log record template 18-1B, 18-2B-18-NB. For example, in this particular example, the occurrence information 98 indicates that the log records 12-1A-12-1M include 100 occurrences of log records 12-1A-12-1M that correspond to the log record template 18-1B (log record template 1 (LRT1)), 12 occurrences of log records 12-1A-12-1M that correspond to the log record template 18-2B (log record template 2 (LRT2)), and 4 occurrences of log records 12-1A-12-1M that correspond to the log record template 18-NB (log record template N (LRTN)).

The log record analyzer 90 may also generate occurrence percentile information 100 that identifies, for each log record template 18-1B, 18-2B-18-NB, the percentage of the number of occurrences of log records 12-1A-12-1M that correspond to the respective log record template 18-1B, 18-2B-18-NB with respect to the total number of log records 12-1A-12-1M. For example, in this particular example, the occurrence percentile information 100 indicates that log records 12-1A-12-1M that correspond to the log record template 18-1B make up 43% of all the log records 12-1A-12-1M, log records 12-1A-12-1M that correspond to the log record template 18-2B make up 4% of all the log records 12-1A-12-1M, and log records 12-1A-12-1M that correspond to the log record template 18-NB make up 2% of all the log records 12-1A-12-1M.

The log record analyzer 90 may also determine a size of the log records 12-1A-12-1M that correspond to each log record template 18-1B, 18-2B, 18-NB. For example, a log record 12-1A-12-1M that corresponds to one log record template 18-1B, 18-2B-18-NB may have an average size that is 1/10 of the average size of a log record 12-1A-12-1M that corresponds to a different log record template 18-1B, 18-2B-18-NB simply because of the size of the textual strings 22 contained in the log record template 18-1B, 18-2B-18-NB and/or due to the number of different field identifiers 20 contained in the log record template 18-1B, 18-2B-18-NB. The log record analyzer 90 may maintain size percentile information 102 that identifies, for each log record template 18-1B, 18-2B-18-NB, the percentage of the size of the log records 12-1A-12-1M that correspond to the respective log record template 18-1B, 18-2B-18-NB with respect to the total size of all log records 12-1A-12-1M. For example, in this particular example, the size percentile information 102 indicates that log records 12-1A-12-1M that correspond to the log record template 18-1B make up 66% of the overall size of all the log records 12-1A-12-1M, log records 12-1A-12-1M that correspond to the log record template 18-2B make up 2% of the overall size of all the log records 12-1A-12-1M, and log records 12-1A-12-1M that correspond to the log record template 18-NB make up 7% of the overall size of all the log records 12-1A-12-1M.

Often the log records 12-1A-12-1M will include a timestamp that identifies a time at which the log record 12-1A-12-1M was generated. In some implementations the log record analyzer 90 may maintain frequency information 104 that identifies, for each log record template 18-1B, 18-2B-18-NB, the average frequency, such as in seconds, that log records 12-1A-12-1M that correspond to the respective log record template 18-1B, 18-2B-18-NB are generated. For example, in this particular example, the frequency information 104 indicates that log records 12-1A-12-1M that correspond to the log record template 18-1B are generated every 0.6 seconds, log records 12-1A-12-1M that correspond to the log record template 18-2B are generated every 6 seconds, and log records 12-1A-12-1M that correspond to the log record template 18-NB are generated every 12 seconds.

In general, the log record analyzer 90 analyzes the log records 12-1A-12-1M to determine a particular log record template 18-1B, 18-2B-18-NB to which a majority of the plurality of log records 12-1A-12-1M corresponds, and then takes some action that is at least partially based on the particular log record template 18-1B, 18-2B-18-NB. In one example, the action may be to generate and present graphical information, such as a histogram 106, that identifies, for each log record template 18-1B, 18-2B-18-NB, statistical information. In this example, the statistical information includes the number of occurrences of the log records 12-1A-12-1M that correspond to each log record template 18-1B, 18-2B-18-NB and/or a percentage of the number of occurrences of the log records 12-1A-12-1M that correspond to each log record template 18-1B, 18-2B-18-NB with respect to a total number of occurrences of the plurality of log records 12-1A-12-1M.

As an example, the histogram 106 indicates that there are 100 occurrences of log records 12-1A-12-1M that correspond to the log record template 18-1B (log record template 1), and that the 100 occurrences make up 43% of all occurrences of all log records 12-1A-12-1M. The histogram 106 illustrates visually that the log records 12-1A-12-1M that correspond to the log record template 18-1B are generated at a rate much greater than log records 12-1A-12-1M that correspond to any other log record template 18-2B-18-NB. A user, such as an engineer, may, based on this information, desire to examine the set of logging instructions in the logging entity 14-1A responsible for generating log records 12-1A-12-1M that correspond to the log record template 18-1B and modify such set of logging instructions to reduce the generation of such log records 12-1A-12-1M. Additional or alternative potential actions taken by the log record analyzer 90 are discussed below.

Figure 11:
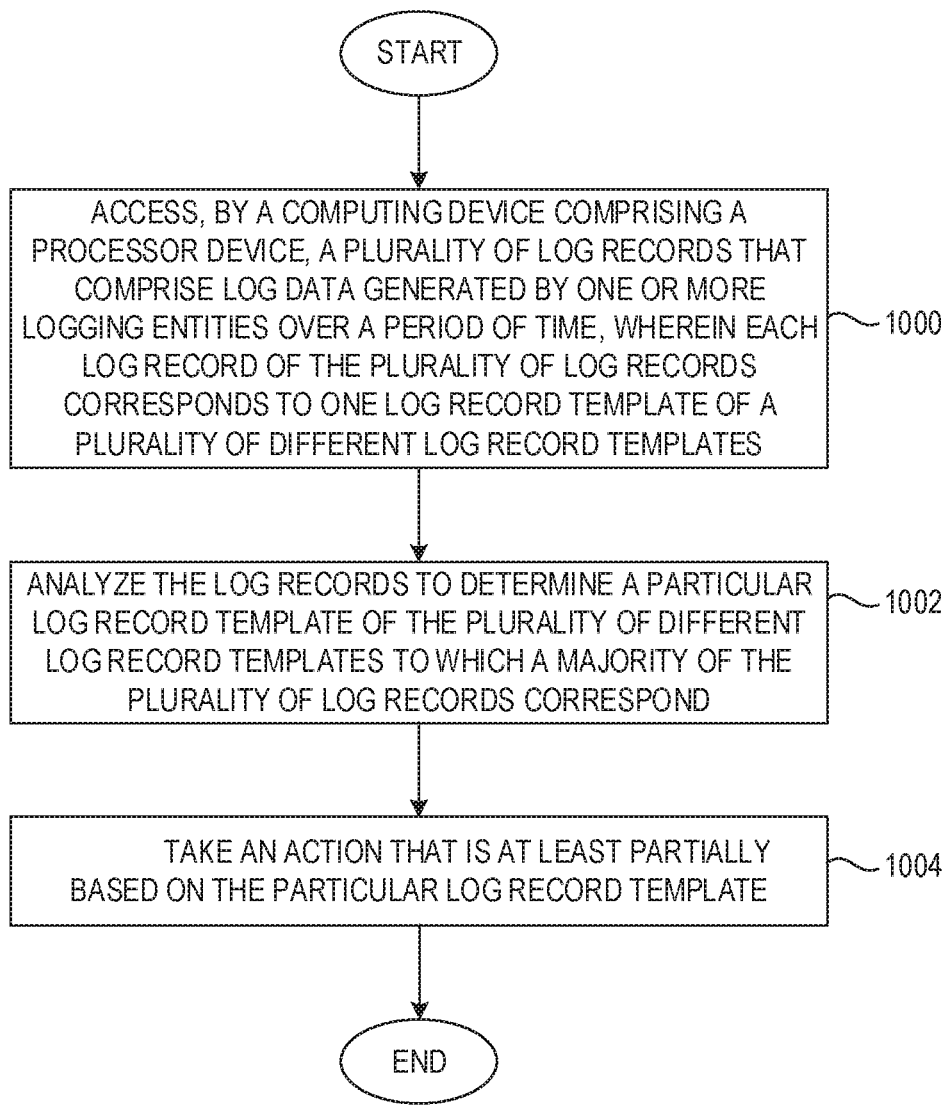
FIG. 11 is a flowchart of a method for log record analysis based on log record templates according to one example.

FIG. 11 is a flowchart of a method for log record analysis based on log record templates according to one example. FIG. 11 will be discussed in conjunction with FIG. 10. The computing device 30 accesses the plurality of log records 12-1A-12-1M that comprise log data generated by the logging entity 14-1A over a period of time, each log record 12-1A-12-1M of the plurality of log records 12-1A-12-1M corresponding to one log record template 18-1B-18-NB of the plurality of different log record templates 18-1B-18-NB (FIG. 11, block 3000). The computing device 30 analyzes the log records 12-1A-12-1M to determine a particular log record template 18-1B-18-NB of the plurality of log record templates 18-1B-18-NB to which a majority of the plurality of log records 12-1A-12-1M corresponds (FIG. 11, block 3002). The computing device 30 takes an action that is at least partially based on the particular log record template 18-1B-18-NB, such as, by way of non-limiting example, generating and presenting the histogram 106 on the display device 47 (FIG. 11, block 3004).

Figure 12:
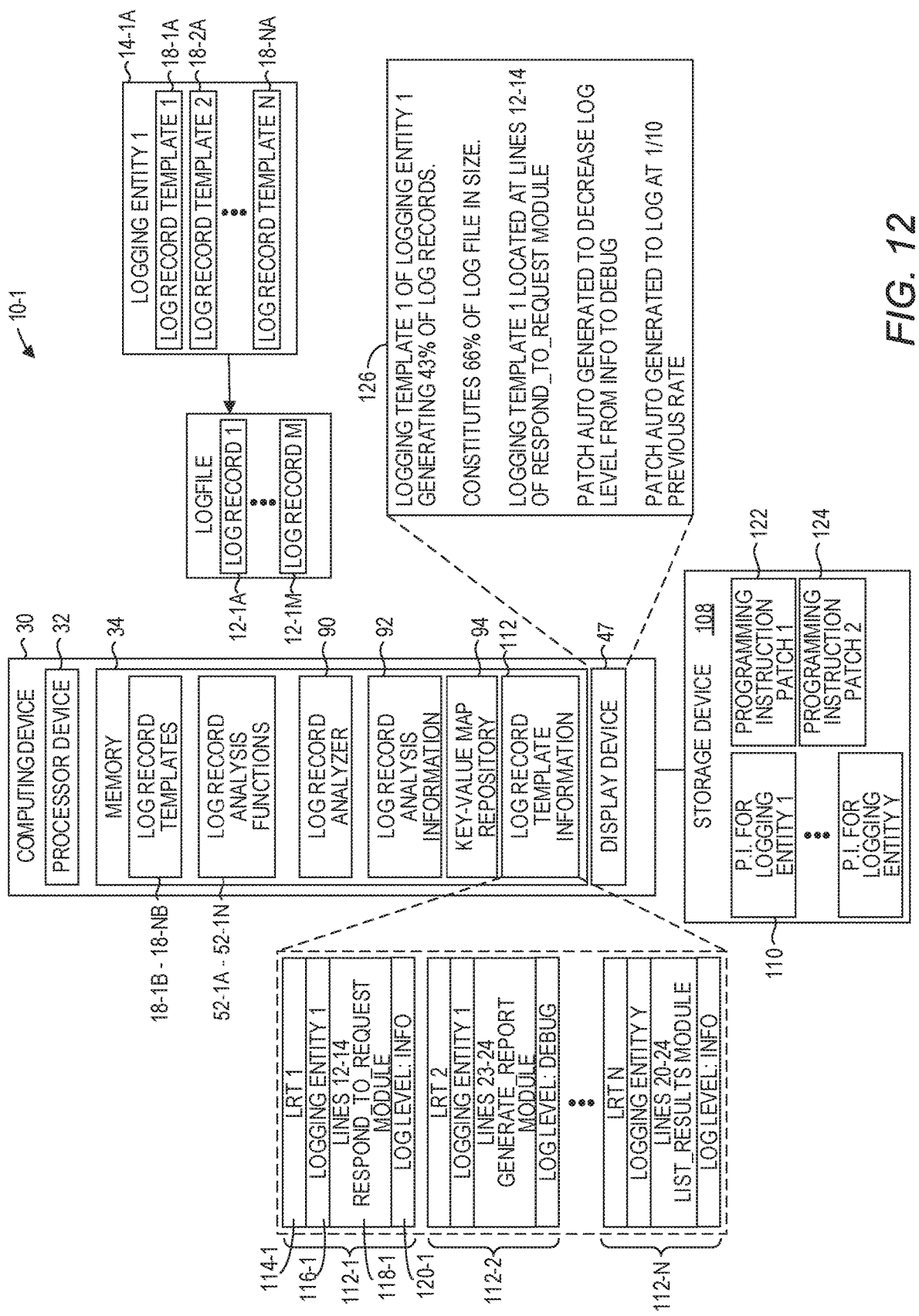
FIG. 12 is a block diagram of an environment illustrating additional features for log record analysis based on log record templates according to additional examples.

FIG. 12 is a block diagram of the environment 10-1 illustrating additional features for log record analysis based on log record templates according to additional examples. As discussed above, the log record templates 18-1B-18-NB correspond to respective log record templates 18-1A-18-NA. In some examples, the log record templates 18-1B-18-NB may be identical to the corresponding log record templates 18-1A-18-NA. In some examples, the log record templates 18-1B-18-NB may be generated by the code analyzer unit 40 by analyzing the programming instructions that correspond to the logging entity 14-1A. In particular, in some examples, the code analyzer unit 40 may be directed to a storage device 108 that contains programming instructions (P.I.) 110 for the logging entity 14-1A. The code analyzer unit 40 may analyze the programming instructions 110 to identify each set of logging instructions in the logging entity 14-1A. Upon locating a set of logging instructions, the code analyzer unit 40 may generate a corresponding log record template 18-1B-18-NB. In some examples, the code analyzer unit 40 may also generate additional log record template information 112 for each set of logging instructions. As an example, after identifying the set of logging instructions that implements the log record template 18-1A, the code analyzer unit 40 generates a log record template information entry 112-1 that contains a log record template correspondence field 114-1 that identifies the log record template 18-1B-18-NB to which the log record template information entry 112-1 corresponds, in this example, the log record template 18-1B (which also corresponds to the log record template 18-1A).

The log record template information entry 112-1 also includes a logging entity identifier field 116-1 that identifies the logging entity 14 to which the log record template information entry 112-1 corresponds, in this example, the logging entity 14-1A. The log record template information entry 112-1 also includes a location identifier field 118-1 that identifies the location in the programming instructions 110 of the set of logging instructions that implements the log record template 18-1A. In this example, the set of logging instructions that implements the log record template 18-1A is contained at lines 12-14 of a "RESPOND_TO_REQUEST" module contained in the programming instructions 110. The log record template information entry 112-1 also includes a storage system log level identifier field 120-1 that identifies the storage system log level (hereinafter log level for the sake of brevity) identified in the set of logging instructions. Certain logging systems have configurable log level features that allow an administrator to designate a configured log level, and log records that have a lower log level than the configured log level are disregarded and not stored. As an example, in one logging system, log levels in descending order comprise CRITICAL, ERROR, WARNING, INFO, DEBUG and TRACE. If a log record is generated and designated a WARNING log level, and if an administrator has set the configured log level to ERROR, the log record will be disregarded and not recorded. If, on the other hand, the administrator has set the configured log level to INFO, then the same log record will be stored.

The code analyzer unit 40 may similarly generate a log record template information entry 112-2 and a log record template information entry 112-N upon identifying the sets of logging instructions that implement the log record templates 18-2A and 18-NA, respectively.

The log record analyzer 90 may utilize the log record template information 112 to implement additional or alternative actions after the analysis of the log records 12-1A-12-1M. For example, after determining that log records 12-1A-12-1M that correspond to the log record template 18-1B make up the majority of the log records 12-1A-12-1M, the log record analyzer 90 may access the log record template information entry 112-1, which corresponds to the log record template 18-1B, and then access the set of logging instructions in the programming instructions 110 based on the location identifier field 118-1. The log record analyzer 90 may then generate a programming instruction patch 122 that is configured to, when applied to the programming instructions 110, alter the log level identified in the set of programming instructions. For example, the programming instruction patch 122 may lower the log level from the INFO log level to the DEBUG log level.

Additionally or alternatively, the log record analyzer 90 may generate a programming instruction patch 124 that is configured to, when applied to the programming instructions 110, generate, at a reduced rate, log records 12 that correspond to the particular log record template 18-1B. For example, the programming instruction patch 124 may maintain a counter, and only issue a log record 12 upon being executed every 10 times to reduce the frequency of log records 12 by $\frac{1}{10}$, or every 100 times to reduce the frequency of log records 12 by $\frac{1}{100}$. Alternatively the programming instruction patch 124 may maintain a counter and a timer, and upon expiration of the timer, generate a log record 12 that indicates the number of log records 12 identified in the counter that would have otherwise been generated. The counter and the timer may then be reset.

The log record analyzer 90 may also generate and present information 126 on the display device 47, which, in this example, identifies the log record template 18-1B as the log record template to which a majority of the plurality of log records 12-1A-12-1M corresponds, identifies statistical information regarding such log records 12-1A-12-1M, identifies the location in the programming instructions 110 of the set of logging instructions that implements the log record template 18-1A (which corresponds to the log record template 18-1B), and identifies that the programming instruction patches 122 and 124 have been automatically generated. Any one or combination of such actions discussed herein may be taken by the log record analyzer 90.

Figure 13:
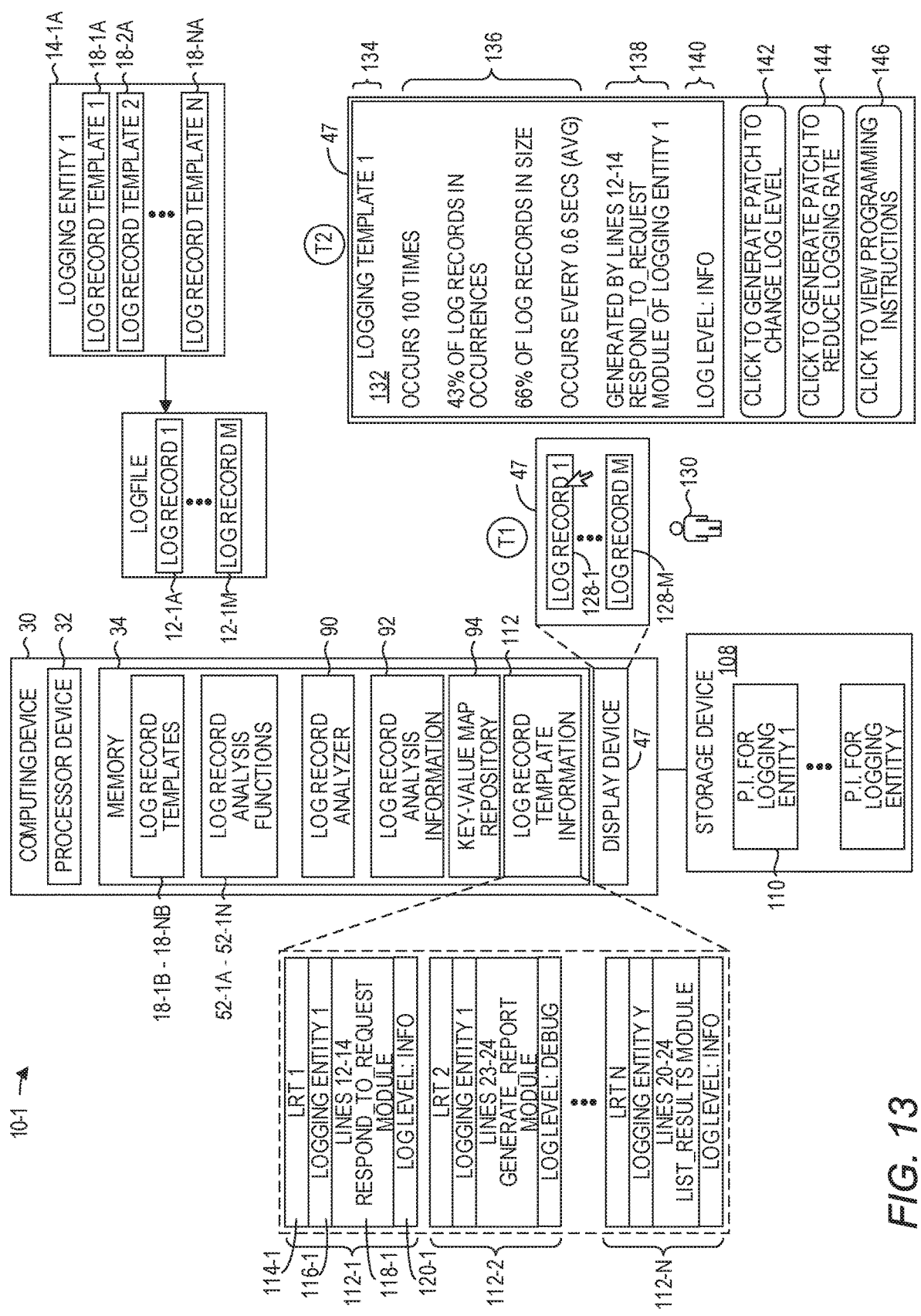
FIG. 13 is a block diagram of an environment illustrating additional features for log record analysis based on log record templates according to additional examples.

FIG. 13 is a block diagram of the environment 10-1 illustrating additional features for log record analysis based on log record templates according to additional examples. In this example, after the log record analyzer 90 has analyzed the log records 12-1A-12-1M, at a time T1, the log record analyzer 90 presents, on the display device 47, selectable information 128-1-128-M that correspond, respectively, to the log records 12-1A-12-1M. The selectable information 128-1-128-M may comprise, for example, the content of the corresponding log records 12-1A-12-1M. In response to a user 130 selecting, for example, the selectable information 128-1, the log record analyzer 90 generates, based on the log record template 18-1B, the log record analysis information 92, the log record template information 112, and a user interface 132 that contains information relevant to the log record 12-1A (which corresponds to the selectable information 128-1), and presents the user interface 132 on the display device 47 at a time T2.

In this example the user interface 132 includes information 134 that identifies the log record template 18-1B as the log record template corresponding to the log record 12-1A. The user interface 132 also includes information 136 that includes statistical information regarding the log records 12-1A-12-1M that correspond to the log record template 18-1B, such as the number of occurrences of such log records 12-1A-12-1M, the percentile of such log records 12-1A-12-1M in terms of occurrences, the percentile of such log records 12-1A-12-1M in terms of size, and the frequency of such log records 12-1A-12-1M. The user interface 132 also includes information 138 that identifies the location in the programming instructions 110 of the set of logging instructions that implements the log record template 18-1A (which corresponds to the log record template 18-1B). The user interface 132 also includes information 140 that identifies the current log level of the log records 12-1A-12-1M that correspond to the log record template 18-1B.

The user interface 132 includes a selectable control 142 that, if selected by the user 130, will cause the log record analyzer 90 to generate a programming instruction patch, such as the programming instruction patch 122 (FIG. 12) that is configured to, when applied to the programming instructions 110, alter the log level identified in the set of logging instructions that implements the log records 12-1A-12-1M that correspond to the log record template 18-1B. The user interface 132 includes a selectable control 144 that, if selected by the user 130, will cause the log record analyzer 90 to generate a programming instruction patch, such as the programming instruction patch 124 (FIG. 12) that is configured to, when applied to the programming instructions 110, generate, at a reduced rate, log records 12 that correspond to the particular log record template 18-1B. The user interface 132 also includes a selectable control 146 that, if selected by the user 130, will cause the log record analyzer 90 to present on the display device 47 the set of logging instructions that implements the log records 12-1A-12-1M that correspond to the log record template 18-1B.

Figure 14:
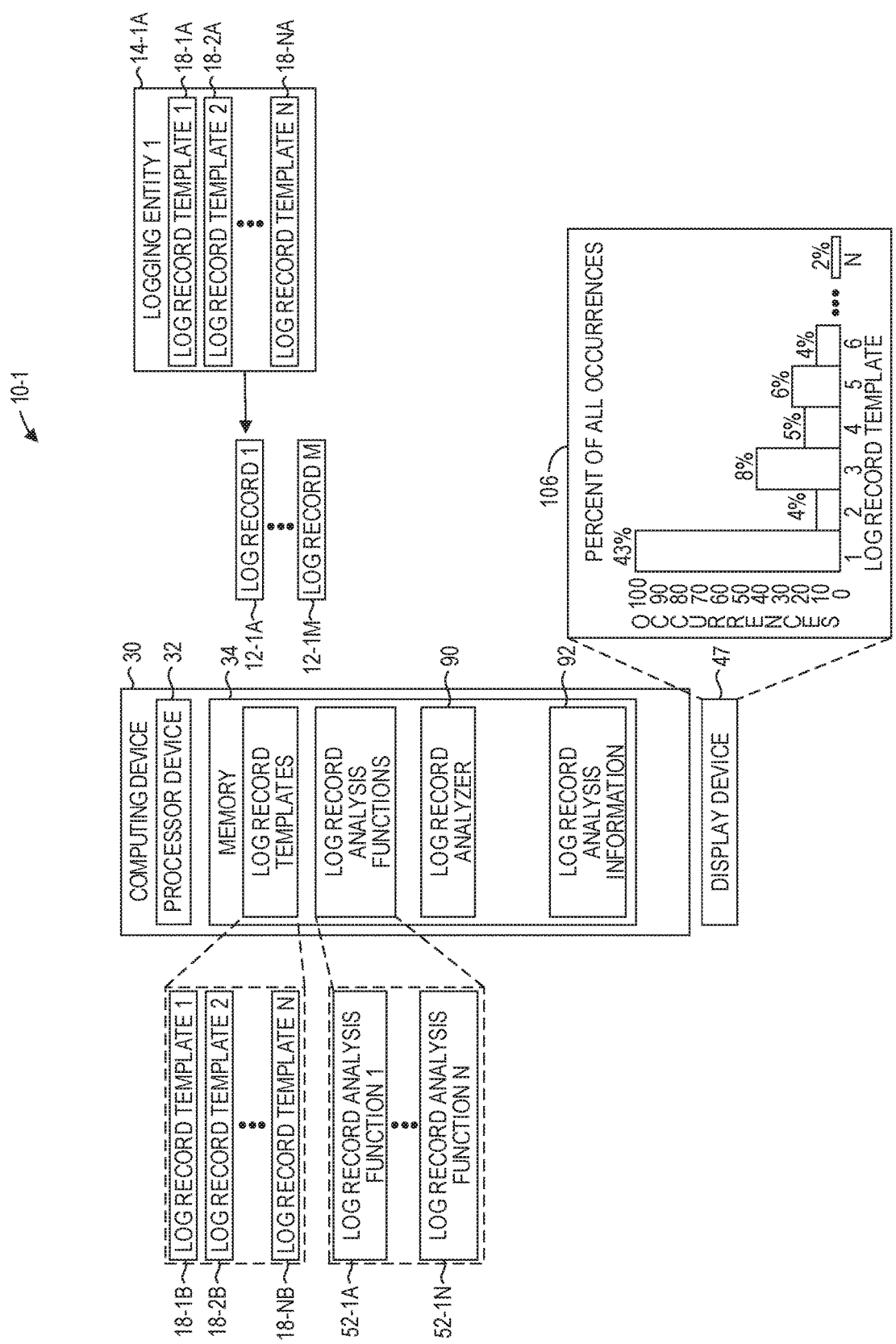
FIG. 14 is a simplified block diagram of the environment illustrated in FIG. 10 according to one example.

FIG. 14 is a simplified block diagram of the environment 10-1 according to one example. The computing device 30 includes the memory 34 and the processor device 32. The processor device 32 is coupled to the memory 34 and is to access the plurality of log records 12-1A-12-1M that comprise log data generated by the logging entity 14-1A over a period of time. Each log record 12-1A-12-1M of the plurality of log records 12-1A-12-1M corresponds to one log record template 18-1B-18-NB of a plurality of different log record templates 18-1B-18-NB. The processor device 32 is further to analyze the log records 12-1A-12-1M to determine a particular log record template 18-1B-18-NB of the plurality of log record templates 18-1B-18-NB to which a majority of the plurality of log records 12-1A-12-1M corresponds. The processor device 32 is further to take an action that is at least partially based on the particular log record template 18-1B-18-NB.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by a computing device comprising a processor device, a plurality of log records that comprise log data generated by one or more logging entities over a period of time, wherein each log record of the plurality of log records corresponds to one log record template of a plurality of different log record templates, each log record template comprising a plurality of field identifiers;
   analyzing the log records to determine a particular log record template of the plurality of different log record templates to which a majority of the plurality of log records corresponds; and
   taking an action that is at least partially based on the particular log record template.

2. The method of claim 1 further comprising:
   determining a location of programming instructions in a logging entity of the one or more logging entities, the programming instructions being responsible for generating log records that correspond to the particular log record template; and wherein taking the action that is at least partially based on the particular log record template comprises presenting information that identifies the location of the programming instructions in the logging entity.

3. The method of claim 1 further comprising:

determining, for each log record template of the plurality of different log record templates, a quantity of log records of the plurality of log records that correspond to the log record template; and wherein taking the action that is at least partially based on the particular log record template comprises presenting information that identifies, for each log record template of the plurality of different log record templates, a number of occurrences of the log records that correspond to the log record template and/or a percentage of the number of occurrences of the log records that correspond to the log record template with respect to a total number of occurrences of the plurality of log records.

4. The method of claim 3 further comprising:

presenting information that identifies, for each log record template of the plurality of different log record templates, a location of programming instructions responsible for generating log records that correspond to the particular log record template.

5. The method of claim 3 wherein presenting the information that identifies, for each log record template of the plurality of different log record templates, the number of occurrences and/or the percentage of the number of occurrences of the log records that correspond to the log record template further comprises:

generating a histogram that identifies, for each log record template of the plurality of log record templates, the number of occurrences and/or the percentage of the number of occurrences of log records that correspond to the log record template; and presenting the histogram on a display device.

6. The method of claim 1 wherein taking the action that is at least partially based on the particular log record template comprises:

determining a storage system log level identified by programming instructions responsible for generating log records that correspond to the particular log record template; and automatically generating a programming instruction patch configured to alter the storage system log level identified by the programming instructions.

7. The method of claim 1 wherein taking the action that is at least partially based on the particular log record template comprises:

accessing programming instructions responsible for generating log records that correspond to the particular log record template; and automatically generating a programming instruction patch that, when applied to the programming instructions, generates at a reduced rate log records that correspond to the particular log record template.

8. The method of claim 1 wherein taking the action that is at least partially based on the particular log record template comprises:

determining a frequency of an occurrence of log records that correspond to the particular log record template; and presenting information that identifies the frequency of the occurrence of the log records.

9. The method of claim 1 wherein taking the action that is at least partially based on the particular log record template comprises:

determining a total data storage size of the plurality of log records;

determining a data storage size of log records that correspond to the particular log record template; and presenting information that identifies a percentage of the data storage size of the log records that correspond to the particular log record template with respect to the total data storage size of the plurality of log records.

10. A computing device, comprising:

a memory; and a processor device coupled to the memory to:

access a plurality of log records that comprise log data generated by one or more logging entities over a period of time, wherein each log record of the plurality of log records corresponds to one log record template of a plurality of different log record templates, each log record template comprising a plurality of field identifiers;

analyze the log records to determine a particular log record template of the plurality of different log record templates to which a majority of the plurality of log records corresponds; and take an action that is at least partially based on the particular log record template.

11. The computing device of claim 10 wherein the processor device is further to:

determine, for each log record template of the plurality of different log record templates, a quantity of log records of the plurality of log records that correspond to the log record template; and wherein to take the action that is at least partially based on the particular log record template, the processor device is further to present information that identifies, for each log record template of the plurality of different log record templates, a number of occurrences of the log records that correspond to the log record template and/or a percentage of the number of occurrences of the log records that correspond to the log record template with respect to a total number of occurrences of the plurality of log records.

12. The computing device of claim 11 wherein the processor device is further to:

present information that identifies, for each log record template of the plurality of different log record templates, a location of programming instructions responsible for generating log records that correspond to the particular log record template.

13. The computing device of claim 11 wherein to present the information that identifies, for each log record template of the plurality of different log record templates, the number of occurrences and/or the percentage of the number of occurrences of the log records that correspond to the log record template, the processor device is further to:

generate a histogram that identifies, for each log record template of the plurality of log record templates, the number of occurrences and/or the percentage of the number of occurrences of the log records that correspond to the log record template; and present the histogram on a display device.

14. The computing device of claim 10 wherein to take the action that is at least partially based on the particular log record template the processor device is further to:

access programming instructions responsible for generating log records that correspond to the particular log record template; and automatically generate a programming instruction patch that, when applied to the programming instructions, generates at a reduced rate log records that correspond to the particular log record template.

15. The computing device of claim 10 wherein to take the action that is at least partially based on the particular log record template the processor device is further to:

determine a frequency of an occurrence of log records that correspond to the particular log record template; and present information that identifies the frequency of the occurrence of the log records.

16. A computer program product stored on a non-transitory computer-readable storage medium and including instructions configured to cause a processor device to:

access a plurality of log records that comprise log data generated by one or more logging entities over a period of time, wherein each log record of the plurality of log records corresponds to one log record template of a plurality of different log record templates, each log record template comprising a plurality of field identifiers;

analyze the log records to determine a particular log record template of the plurality of different log record templates to which a majority of the plurality of log records corresponds; and take an action that is at least partially based on the particular log record template.

17. The computer program product of claim 16 wherein the instructions further cause the processor device to:

determine, for each log record template of the plurality of different log record templates, a quantity of log records of the plurality of log records that correspond to the log record template; and wherein to take the action that is at least partially based on the particular log record template, the instructions further cause the processor device to present information that identifies, for each log record template of the plurality of different log record templates, a number of occurrences of the log records that correspond to the log record template and/or a percentage of the number of occurrences of the log records that correspond to the log record template with respect to a total number of occurrences of the plurality of log records.

18. The computer program product of claim 17 wherein the instructions further cause the processor device to:

present information that identifies, for each log record template of the plurality of different log record templates, a location of programming instructions responsible for generating log records that correspond to the particular log record template.

19. The computer program product of claim 17 wherein to present the information that identifies, for each log record template of the plurality of different log record templates, the number of occurrences and/or the percentage of the number of occurrences of the log records that correspond to the log record template, the instructions further cause the processor device to:

generate a histogram that identifies, for each log record template of the plurality of different log record templates, the number of occurrences and/or the percentage of the number of occurrences of the log records that correspond to the log record template; and present the histogram on a display device.

20. The computer program product of claim 16 wherein to take the action that is at least partially based on the particular log record template the instructions further cause the processor device to:

access programming instructions responsible for generating log records that correspond to the particular log record template; and automatically generate a programming instruction patch that, when applied to the programming instructions, generates at a reduced rate log records that correspond to the particular log record template.

* * * * *